(12) United States Patent
Zabrakes

(10) Patent No.: US 7,344,259 B2
(45) Date of Patent: Mar. 18, 2008

(54) SPOKE AND METHOD FOR APPLYING A SELF-ADHESIVE FILM TO A SURFACE OF A SPOKE

(75) Inventor: Kathrin Zabrakes, Hamburg (DE)

(73) Assignee: Vasileios Zavrakis, Hamburg (DE)

( * ) Notice: Subject to any disclaimer, the term of this patent is extended or adjusted under 35 U.S.C. 154(b) by 0 days.

(21) Appl. No.: 10/503,099

(22) PCT Filed: Jan. 31, 2003

(86) PCT No.: PCT/DE03/00281

§ 371 (c)(1), (2), (4) Date: Jul. 28, 2004

(87) PCT Pub. No.: WO03/064240

PCT Pub. Date: Aug. 7, 2003

(65) Prior Publication Data

US 2005/0083574 A1    Apr. 21, 2005

(30) Foreign Application Priority Data

Jan. 31, 2002  (DE) ............................... 102 03 991

(51) Int. Cl.
*G02B 5/12* (2006.01)
(52) U.S. Cl. ................................... 359/523
(58) Field of Classification Search ......... 359/520–523
See application file for complete search history.

(56) References Cited

U.S. PATENT DOCUMENTS 5,801,883 A    9/1998 Peters 5,923,483 A * 7/1999 Sloot ........................... 359/523
6,517,166 B1 * 2/2003 Chen ...................... 301/37.108

FOREIGN PATENT DOCUMENTS

| AU | 1298183 | 10/1983 |
|---|---|---|
| CA | 2165764 | 6/1921 |
| CH | 411196 | 4/1962 |
| CH | 684532 | 10/1994 |
| DE | 955983 | 1/1957 |
| DE | 7825643 | 2/1982 |
| DE | 8122881 | 5/1982 |
| DE | 3240379 | 5/1984 |
| DE | 8800680 | 12/1988 |
| DE | 196 07 752 C1 | 4/1997 |

OTHER PUBLICATIONS

Patent Abstracts of Japan, Bd. 2002, No. 12, Dec. 12, 2002 & JP 2002 229487 A (Seki Kuniharu), Aug. 14, 2002.

* cited by examiner

*Primary Examiner*—Euncha P. Cherry
(74) *Attorney, Agent, or Firm*—Friedrich Kueffner

(57) ABSTRACT

The invention relates to a spoke (1) which exhibits reflective and/or luminescent properties. Said properties are produced in such a way that a surface (13) of the spoke is covered with a film (7) which is provided with a reflective and/or luminescent covering on the side opposite the surface. The film is removed from a roll and separated into appropriate pieces. An adhesive provided on the film is provided with a protective layer before being applied to the spoke, said protective layer being removed before processing. The adhesive is pressed between the film and the surface of the spoke in order to ensure lasting placement of the film on the spoke.

27 Claims, 3 Drawing Sheets

SPOKE AND METHOD FOR APPLYING A SELF-ADHESIVE FILM TO A SURFACE OF A SPOKE

BACKGROUND OF THE INVENTION

1. Field of the Invention

The invention concerns a spoke for joining a wheel hub to a wheel rim.

The invention also concerns a method for applying a self-adhesive film to a surface of a spoke.

2. Description of the Related Art

Due to increasing traffic density, a bicycle rider's risk of injury is also increasing. Especially at night, bicycle riders and their bicycles are poorly recognized by car drivers and are easily confused with other light sources.

For this reason, there has long been a trend to make bicycle riders recognizable at night by means of reflective or luminescent parts of the bicycle. In particular, efforts have been made to make specific motional actions so apparent that the driver of a car can clearly attribute them to a bicycle rider. For this purpose, for example, pedals have been provided with reflective surfaces, which are perceived as light reflections moving up and down by a car driver approaching the bicycle rider from behind. These moving light reflections are correctly interpreted by the car driver as the pedal motions of a bicycle rider.

However, bicycle riders riding across the direction of travel of a car continue to be poorly recognized, for example, when they are riding at right angles to the direction of travel of the car at the intersection of two streets. To be sure, an approaching car driver moving transversely to the direction of travel of a bicycle rider would have to be able to notice a beam of light from the headlight that should be mounted on the bicycle. However, aside from the fact that in many cases the bicycle headlight does not operate satisfactorily, the headlight is a light source that cannot be specifically attributed to a moving bicycle. The headlight cannot be associated with the typical motions of a bicycle.

To be sure, it has already been proposed that the spokes and rims of bicycles be provided with luminescent and/or reflective coatings, and it has also already been proposed that the spokes and rims be coated with reflective films. However, it was found that the films could not be joined with the spokes and rims so durably that a permanent reflective or luminescent effect was obtained. Furthermore, legal requirements to provide spokes and rims with a reflective and/or luminescent effect were not created.

SUMMARY OF THE INVENTION

Therefore, the objective of the present invention is to provide a spoke with a reflective and/or luminescent effect that is permanently joined with said spoke. A further objective of the invention is to specify a method by which spokes can be covered with a reflective and/or luminescent film.

The objective with respect to the spoke is achieved by adhesively joining its surface with a film which has a reflective and/or luminescent coating on its side facing away from the surface of the spoke.

This adhesive film coating produces an intimate bond between the surface of the spoke and the film that can withstand even severe weather conditions. In addition, it is relatively inexpensive to provide these films with an adhesive layer that is suitable for adhering well to a surface of a spoke.

The objective with respect to the method is achieved by separating a strip from the film, which is wound on a roll, removing from the strip an end of a protective layer that covers the adhesive, adhesively applying the uncovered adhesive on the end of the strip to the surface of the spoke, pulling the protective layer off the adhesive, and, while pulling off the protective layer, pressing the side of the film that is covered with adhesive onto the surface of the spoke.

This method makes it possible to produce a permanent bond between the luminescent or reflective film and the surface of the spoke by technically simple means. In this way, mass-produced luminescent or reflective films can be used to cover the surfaces of spokes.

In accordance with one embodiment of the invention, a strip can be unwound and separated from a roll on which the film is provided in a width of 8 mm and a length of about 1.000 m. It is also possible to pull the strip continuously from the roll.

In accordance with another preferred embodiment of the invention, the side coated with the adhesive is covered with a protective layer that is to be removed before adhesive bonding. This protective layer prevents impairment of the adhesive force of the adhesive. The adhesive retains its full adhesive force, so that the film can be permanently bonded to the spoke. Loss of adhesive force, for example, by contamination of the adhesive or damage to the adhesive, is excluded in this way.

In accordance with another preferred embodiment of the invention, the protective layer is formed as a coherent cover layer, which, when it is pulled off, leaves the adhesive on the side of the film coated with the adhesive. This cover layer is carefully adjusted to the type of adhesive to guarantee that when it is pulled off, the adhesive remains on the side of the film that is to be adhesively bonded to the spoke. In this way, the adhesive is available for permanently bonding the film to the surface of the spoke.

In accordance with another preferred embodiment of the invention, the film has a consistency that allows it to tightly fit the surface to be wrapped. The consistency is selected in such a way that, despite the small cross section of a spoke, the surface of the spoke can be covered without the formation of wrinkles. In this covering operation, relatively small forces must be applied, so that it is also possible to cover the surface quickly.

In accordance with another preferred embodiment of the invention, the film furnished with the reflective and/or luminescent coating has a thickness of no more than 0.25 mm, and preferably no more than 0.1 mm. A film this thin matches the cross section of a spoke especially well and prevents the formation of areas with poor adhesive bonding, which could be penetrated by dirt, which in turn could promote detachment of the film.

In accordance with another preferred embodiment of the invention, the film furnished with the reflective and/or luminescent coating has an elasticity of at least 5-50%, and preferably 5-25%. A film this elastic can conform to the surface of the spoke without any problems, so that the intrinsic restoring forces of the stretched film ensure optimal adaptation of the film to the surface.

In accordance with another preferred embodiment of the invention, the unstretched film is formed as a strip whose width is narrower than the circumference of the spoke. In this way, when the film is subjected to a pre-stretching force, it can be adhesively attached to the surface of a spoke in such a way that adjacent edges touch each other but do not overlap. This prevents the formation of even very small spaces beneath the adhesively attached film into which environmental moisture could enter. Alternatively, slight overlapping, for example, of about 1 mm, can be realized instead of pre-stretching.

In accordance with another preferred embodiment of the invention, the reflective and/or luminescent coating is provided with a protective layer. This protective layer prevents the reflective and/or luminescent coating from being damaged by mechanical stresses. This makes it possible for the film to be applied to the surface of the spoke by machine without damaging the coating that has the reflective and/or luminescent effect.

In accordance with another preferred embodiment of the invention, the protective layer can be pulled off the side of the film with the reflective and/or luminescent coating. This manner of joining the protective layer with the reflective and/or luminescent coating that it protects makes it possible to detach the protective layer quickly and easily from the reflective and/or luminescent coating without the coating being damaged as the protective layer is being detached. This type of protective layer guarantees that the film has its full reflective and/or luminescent effects after the protective layer has been detached from the coating.

In accordance with another preferred embodiment of the invention, the protective layer has a consistency that prevents the coated film from buckling. This gives the protective layer the ability to provide support to the coating, so that buckling damage of the coating cannot occur. This must be avoided, because buckling of the coating can cause the development of hair cracks, which could allow water to penetrate the coating. The intrusion of water would be expected to cause detachment of the coating from the film.

In accordance with another preferred embodiment of the invention, the protective layer has a thickness of at least 0.15 mm, preferably 0.05 mm. A layer this thick is able to protect the protective layer from mechanical damage.

In accordance with another preferred embodiment of the invention, after the film has been applied, the adhesive adheres more strongly to the surface of the spoke than the protective layer adheres to the reflective and/or luminescent coating. This selection of the individual adhesive bonds and layer materials ensures that the film can be strongly adhesively attached to the spoke. Even during the detachment of the protective layer, there is no need to fear that the adhesive will loosen from the surface of the spoke and thus that the film will adhere poorly to the surface of the spoke and be unable to fulfill its reflective function.

In accordance with another preferred embodiment of the invention, the protective layer is formed as a coherent layer, which, when it is pulled off, leaves the reflective and/or luminescent coating on the film. The reflective and/or luminescent coating thus adheres more strongly to the film than the protective layer adheres to the coating. Nevertheless, the protective layer is able to fulfill its function of protecting the coating from mechanical damage.

In accordance with the invention, the objective with respect to the method is achieved by separating a strip of film rolled on a film roll, removing from the strip an end of a protective layer that covers the adhesive, adhesively applying the uncovered adhesive on the end of the strip to the surface of the spoke, pulling the protective layer off the adhesive, and, while pulling off the protective layer, pressing the side of the film that is coated with adhesive onto the surface of the spoke.

This attachment of the self-adhesive film in the area of one of the two ends of a strip gives the strip a specific alignment relative to the spoke. In addition, the strip is held in a certain position, so that systematic detachment of the protective layer from the adhesive is possible. This detachment occurs immediately before the adhesive is pressed against the surface of the spoke, so that the adhesive never loses any of its adhesiveness.

In accordance with another preferred embodiment of the invention, an undersized length of strip is removed from the roll and during its application to the surface of the spoke, it is stretched and adhesively attached to the surface of the spoke under tension. When the strip is dimensioned in this way, the ends of the strip are immediately adjacent to each other after the strip has been applied to the spoke. Overlapping of the ends is avoided. On the other hand, the pre-stretching of the strip produces a restoring force in the strip, which is suitable for tightly stretching the strip around the spoke, so that the strip is firmly pressed onto the surface of the spoke. This prevents wrinkling.

In accordance with another preferred embodiment of the invention, the side of the strip that faces away from the adhesive is inserted in a mold, whose two halves are swung open, the spoke is lowered onto the surface of the strip that is covered with adhesive, the protective layer on the adhesive is removed, and the mold is closed, which causes the strip to be pressed against the surface of the spoke. The use of this mold largely mechanizes the adhesive attachment of the strip to the surface of the spoke, so that the surface of each spoke can be reliably covered with the adhesive film.

In accordance with another preferred embodiment of the invention, the strip is applied spirally around the spoke, starting at its end that is adhesively attached to the surface, during which process the protective layer is pulled off, and the adhesive is bonded with the surface of the spoke. In this way, a constant tension can be applied to the strip during its application to the surface of the spoke. This avoids stress on the strip over a large area, so that there is less risk of wrinkles forming in the strip.

In accordance with another preferred embodiment of the invention, the spoke is moved longitudinally past a transfer point that guides the strip towards the surface of the spoke, and in the process the side of the strip with the adhesive layer is pressed onto the surface of the spoke, and, in addition, the spoke is turned about its longitudinal axis as it moves in the direction of its longitudinal axis. In this way, the spiral guidance of the strip is brought about by moving the spoke in a certain way. These movements of the spoke can be controlled in a relatively simple way, so that the surface of the spoke can be seamlessly covered with the film.

In accordance with another preferred embodiment of the invention, the motions of the spoke in the longitudinal direction, on the one hand, and about its longitudinal axis, on the other hand, are mutually adjusted in such a way that the spoke is wrapped in the form of a slowly advancing spiral. The control of these motional processes is relatively simple, so that, depending on the use of specific types of films and spokes with specific surface finishes, the motions of the spoke can be adapted to the given conditions.

In accordance with another preferred embodiment of the invention, a protective layer of the side of the strip facing the adhesive is pulled from the strip, which is adhesively attached at one end to the surface of the spoke. This unwinding of the protective layer can occur directly in the area of the transfer point, so that good guidance of the unwinding device for taking up the protective layer is possible.

In accordance with another preferred embodiment of the invention, the protective layer is pulled from a reflective and/or luminescent coating of the film. Correct choice of a protective layer ensures that the reflective and/or luminescent coating of the film does not suffer any damage when the protective layer is pulled off.

In accordance with another preferred embodiment of the invention, the spokes are washed with a fat-dissolving cleaning liquid before the film is applied. This ensures that the adhesive provided on the back of the film will bond well with the cleaned surface of the spokes.

Further details of the invention are revealed in the detailed description below and in the accompanying drawings, in which an example of a preferred embodiment of the invention is illustrated.

DETAILED DESCRIPTION OF THE INVENTION

Figure 1:
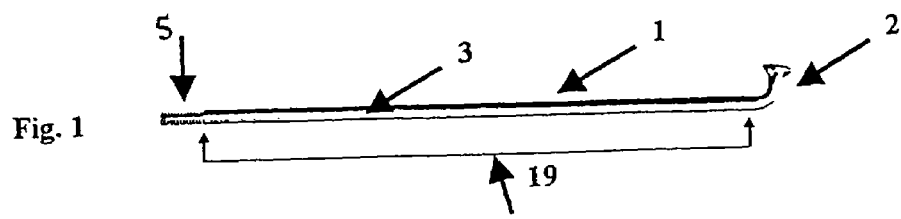
FIG. 1 shows a side view of the spoke.
Figure 2:
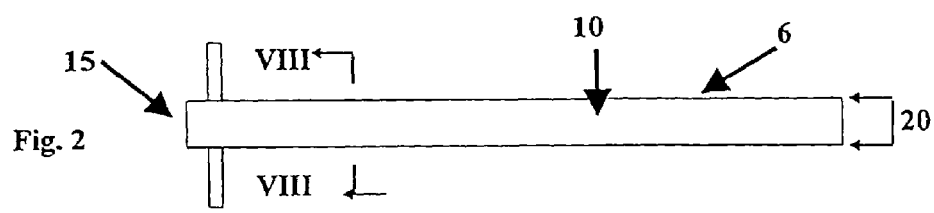
FIG. 2 shows a top view of a strip.
Figure 3:
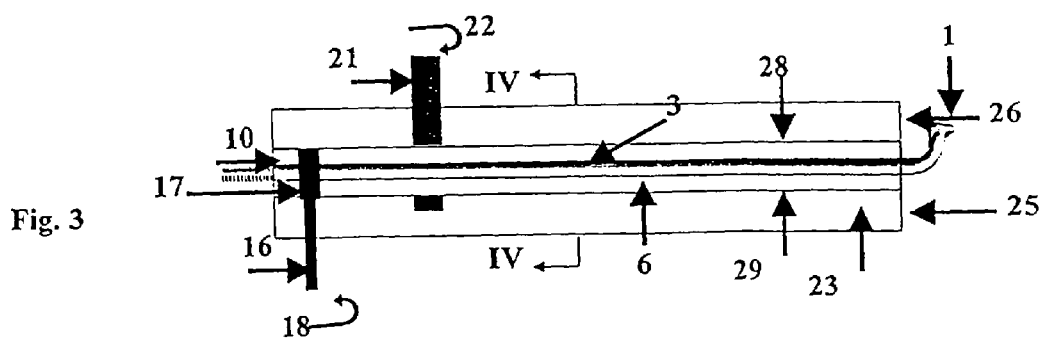
FIG. 3 a top view of an open mold with an inserted strip and an inserted spoke.
Figure 4:
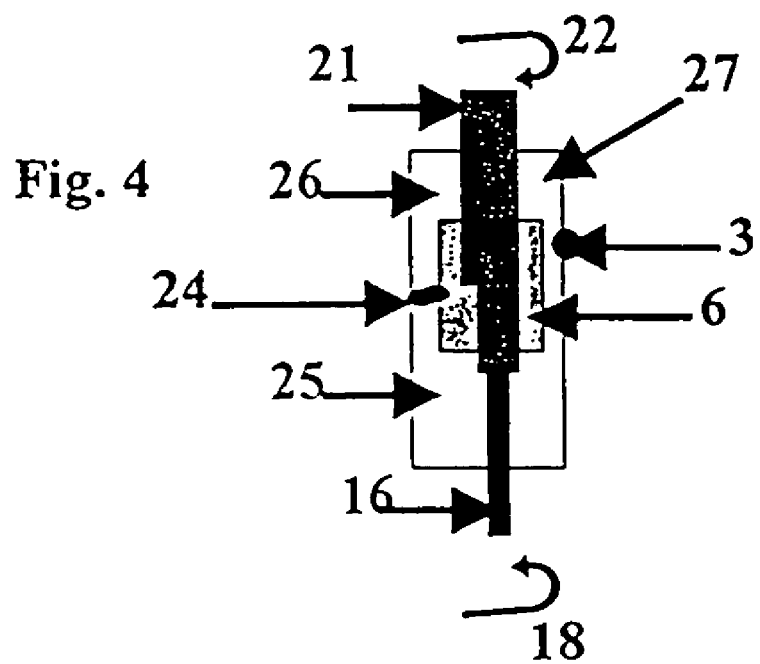
FIG. 4 shows a cross section of an open mold along sectional line IV-IV in FIG. 3.
Figure 5:
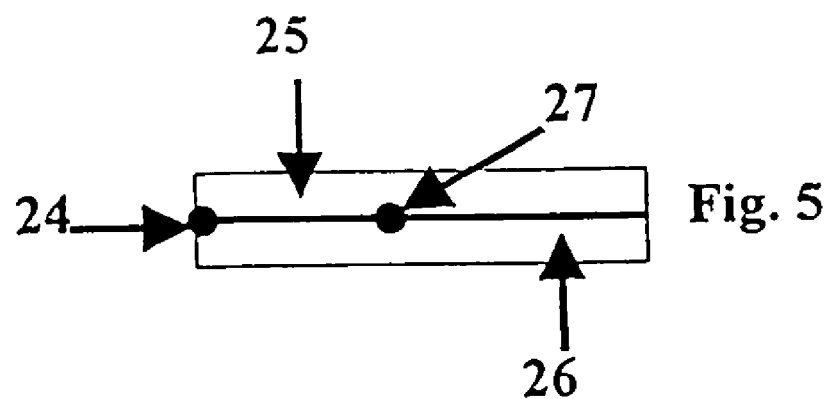
FIG. 5 shows a cross section of a closed mold.
Figure 6:
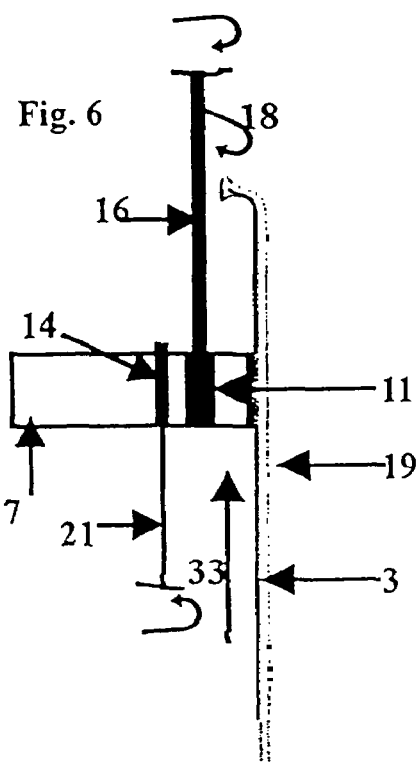
FIG. 6 shows a schematic representation of a winding device for the spiral wrapping of a spoke.
Figure 7:
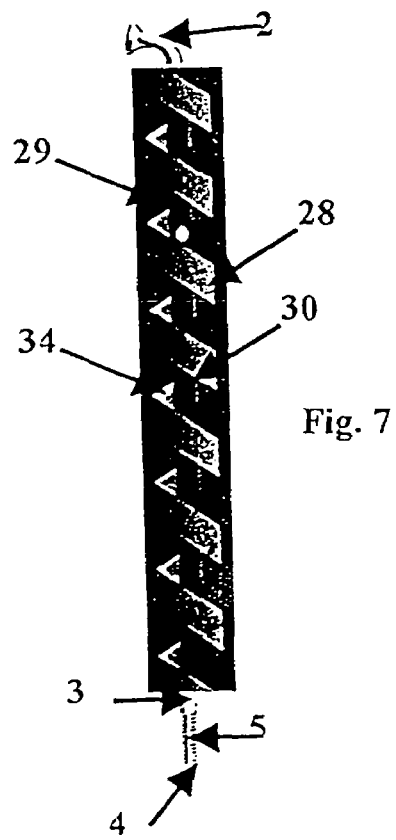
FIG. 7 shows a spirally wrapped spoke.
Figure 8:
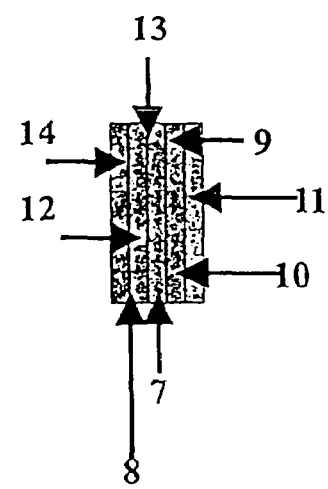
FIG. 8 shows a cross section of a strip along sectional line VIII-VIII in FIG. 2.

A spoke (1) consists essentially of a spoke head (2), a spoke shaft (3), and a spoke end (4), into which a thread (5) is cut.

The spoke head (2) extends through an opening of a hub (not shown) of a wheel (also not shown), and the spoke end (4) is screwed into a rim that surrounds the hub. The spokes (1) are arranged in such a way that the rim surrounds the hub concentrically.

A strip (6) of film (7) is attached to the spoke shaft (3) by means of an adhesive (10) applied on one (9) of the two surfaces (8, 9) of the film. The adhesive (10) is covered with a protective layer (11), which prevents the adhesive (10) from being damaged, for example, by contamination or erosion.

The surface (8) on the opposite side of the film (7) from the adhesive (10) is provided with a coating (12), which consists of a reflective and/or luminescent material. The surface (13) of this coating (12) that faces away from the film (7) is covered with a protective layer (14), which completely covers the entire area of the surface (13) and prevents it from being damaged. The protective layer (14) consists of a coherent layer that can be pulled off as a whole from the surface (13). It is formed as a relatively stiff layer that is highly resistant to mechanical damage.

To attach the strip (6) to the spoke shaft (3), the protective layer (11) is first pulled off the adhesive (10) at one end (15) of the strip (6). For this purpose, the protective layer (11) can be wound with its end (15) around a winding rod (16), which is twisted about its own axis in the direction of rotation (18) to remove the protective layer (11). This results in the protective layer (11) being pulled off the adhesive (10), so that the adhesive comes into direct contact with the surface (19) of the spoke shaft (3) and firmly adheres to it. In this way, the strip (6) gets a hold in the area of the end (17) by the application of pressure on the exposed adhesive (10), so that the entire protective layer (11) can be removed from the adhesive (10) by further winding of the winding rod (16). With progressive removal of the protective layer (11) from the adhesive (10), the strip (6) can then be wrapped with its whole width (20) around the spoke shaft (3) and adhesively bonded to it.

At the same time, with increasing unwinding of the protective layer (11), the protective layer (14) is also pulled off the surface (13) of the coating (12) by means of a roll (21). This roll (21) has a larger cross section than the winding rod (16), since the coating (12) consists of a more resistant material than the protective layer (11). Therefore, this coating (12) cannot be wound onto a winding rod (16) with a small diameter. When the roll (21) is turned about its own axis in the direction of rotation (22), the protective layer (14) is taken up by the roll (21). In this way, the surface (13) of the coating (12) retains the desired reflective and/or luminescent effect.

After removal of the protective layer (14), the strip (6) can be wound around the spoke shaft (3) without any difficulties, so that the strip (6) adheres tightly to the surface (19) of the spoke shaft (3), since the film (7) has a consistency that allows it to closely fit the surface (19) that is to be wrapped. This consistency provides the strip (6) with firm contact on the spoke shaft (3) after the protective layer (14) has been removed. When the protective layer (14) is removed, the coating (12) remains firmly adherent to the surface (13) of the film (7). Provision is also made to ensure that the adhesive (10) adheres so strongly to the surface (19) of the spoke shaft (3) that when the protective layer (14) is removed by means of the roll (21), the adhesive bond of the adhesive (10) on the surface (19) of the spoke shaft (3) is not broken.

The film (7) has material properties that are suitable for producing a strong bond with the surface (19) of the spoke shaft (3). These include above all good flexibility of the film (7).

The film (7), including the reflective and/or luminescent coating (12), has a thickness of not more than 0.25 mm. Due to the thinness of the film (7) and the coating (12) adhering to it, the film (7) can be wrapped very tightly on the spoke shaft (3), so that a wrinkle-free bond with the spoke shaft (3) occurs. Due to this wrinkle-free application of the film (7) and its coating (12), the coating (12) is able to develop an optimum reflective and/or luminescent effect.

Furthermore, the film (7) with its coating (12) has an elasticity of at least 5-50%. This high elasticity of the film (7) with the coating (12) makes it possible to produce a strong bond between the adhesive (10) and the surface (19) of the spoke shaft (3). In this regard, when the film (7) is being applied to the surface (19), it is more or less strongly prestressed both in the longitudinal direction and transversely to the longitudinal direction, depending on the type of film (7). After the film (7) has bonded to the surface (19) under this pretension, the restoring forces produced by the film (7) and present in it provide contact pressure, by which the film (7) is pressed against the surface (19). In this way, the forces introduced into the film (7) act to promote flawless bonding of the film (7) with the surface (19).

The film (7) furnished with its coating (12) is delivered by its manufacturer in the form of a roll. The roll has a width that is dimensioned in such a way that it can just encircle the spoke shaft (3) in its pre-stretched state, so that the two longitudinal edges of a strip (6) separated from the film are flush with each other after bonding with the surface (19). For this purpose, the width of the film is dimensioned in such a way that it is narrower than the circumference of the spoke (1). This guarantees that after a precalculated pretension is applied, the longitudinal edges of a strip (6) separated from the film (7) directly abut. The greater the elasticity of the film is, the narrower the strips (6) for bonding to the surface (19) are designed.

The protective layer (14) can be removed from the reflective and/or luminescent coating (12) without the coating (12) separating from the film (7). Furthermore, the bond between the adhesive (10) and the surface (19) of the spoke shaft (3) is formed in such a way that when the protective layer (14) is pulled off the coating (12), separation of the adhesive (10) from the surface (19) is prevented.

Before the film (7) is applied to the spoke (1), the spoke is washed in a fat-dissolving cleaning liquid. This washing operation is controlled in such a way that all fat residue that may be present has been removed from the surface (19) of the spoke shaft at the end of the operation. Then, to apply the film (7) with its coating (12) to the surface of the spoke shaft (3), the protective layer (11) is first removed from the adhesive (10) at the end of the strip (6), and the adhesive (10) is bonded to the surface (19) at a place on the surface (19) provided for this purpose. This gives the strip (6) a predetermined orientation relative to the spoke (1). The protective layer (11) is then pulled off the strip (6) in the longitudinal direction of the strip, and the strip (6) is pressed against the spoke shaft (3). At the same time, the protective layer (14) is removed from the reflective and/or luminescent coating (12), so that the film (7) furnished with this coating (12) develops the elasticity necessary for covering the surface (19). The film (7) can then be pressed against the surface (19), so that it adheres to the surface without forming wrinkles.

The pressing can be carried out in a mold (23), which consists of two mold halves (25, 26) that can be swung about a hinge (24) relative to each other. Both halves (25, 26) of the mold have a depression (27), in which the strip (6) can be inserted. Half of each strip (6) runs in each of the two mold halves (25, 26).

With the surface (19) of its spoke shaft (3) slightly angled, the spoke (1) is then placed in this position on the adhesive (10), from which the end (17) of the protective layer (11) has been removed in the meantime. In this way, the surface (19) is adhesively bonded with the adhesive at a point, so that the critical starting point for the adhesive bonding of the spoke is predetermined. The protective layer (11) can then be pulled off the adhesive (10), for example, by winding it with the winding rod (16). This causes the spoke (1) to drop farther towards the adhesive (10), so that, finally, adhesive bonding of the strip (6) occurs along the whole length of the spoke shaft (3). At the same time, the protective layer (14) is wound on the roll (21) by winding motions in the direction of rotation (22).

After the spoke (1) has been adhesively bonded and the protective layer (14) has been removed from the whole length of the strip (6), the two halves (25, 26) of the mold are swung about the hinge (24). During this swinging process, the strip (6) is pressed around the spoke shaft (3), so that the strip (6) is adhesively bonded with the spoke shaft (3) along its whole length. The swinging process causes the strip (6), which is firmly supported in the depression (23), to be slightly pre-stretched, so that the parallel longitudinal edges (28, 29) of the strip (6) abut on the surface (19) of the spoke shaft (3). At the same time, the mold (23) exerts a force on the strip (6), which is sufficiently strong to press the adhesive (10) against the spoke shaft (3) and thus produce a good adhesive bond between the strip (6) and the surface (19) of the spoke shaft (3).

However, the film (7) can also be wound on the spoke shaft (3) in the form of a spiral (30). For this purpose, the film (7) is guided from a film roll (not shown) to a transfer point (31). In the area of the transfer point (1), a protective layer (11) is removed from the adhesive (13) of the film (7), and an end (32) with exposed adhesive (10) is adhesively attached to the surface (19) of the spoke shaft (3). The protective layer (1) separated from the film (7) is wound on a winding rod (16), which is turned about its own axis in the direction of rotation (18). As this occurs, the protective layer (11) separated from the film (7) adheres to the winding rod (16) and is wound onto it. The winding rod (16) has a winding rate that is sufficiently fast that, at a preset wrapping speed of the film (7), the protective layer (11) is removed from the film (7) just in time for the adhesive to make contact with the surface (19) of the spoke shaft. To be able to produce flawless bonding of the film (7) to the surface (19), after the end (32) of the film (7) has been attached to the surface (19) of the spoke shaft (3), the film (7) is held back with a small amount of tension, while the spoke (1) is turned about its longitudinal axis and at the same time is advanced in the direction (33) of its longitudinal axis. This causes the film (7) to wind onto the surface (19) of the spoke shaft (3) in the form of a spiral (30). By introducing a certain amount of tension for holding back the film (7), a tension can be produced in the film, which causes the film to be tightly wound onto the surface (19).

The winding rod (16) is turned in the direction of rotation (18) according to the rate at which the film (7) is wound onto the surface (19), so that the adhesive (10) being exposed by the removal of the protective layer (11) fits closely against the surface (19) and is pressed onto it. The protective layer (14) is unwound from the coating (12) of the film (7) in the same way by means of the roll (21).

By suitable adjustment of the winding rate, at which the film (7) is applied to the surface (19), to the longitudinal advance of the spoke (1) in the direction (33) of its longitudinal axis, the spiral (30) is formed on the surface (19) with a more or less large pitch. As the spiral forms, adjacent longitudinal edges (28, 29) of two adjacent windings are positioned flush against each other. This produces a smooth surface (34) with a reflective and/or luminescent effect that extends over the whole length of the spoke shaft (3).

The film (1) can be configured in such a way, for example, that an adhesive is applied on a first cover film with a thickness of 0.08 to 0.1 mm. The cover film can consist, for example, of a polyester. A support layer is placed on the adhesive. The support layer can consist, for example, of paper, or it can be realized as a plastic film. The support layer is covered with another layer of an adhesive, with which glass spheres are fixed. The glass spheres preferably have a diameter of less than 1 millimeter, and preferably less than 100 $\mu$m, and have air bubbles. Sphere diameters of less than 10 $\mu$m are especially desirable. The glass spheres are partially metallized in the area of their outer surface. Aluminum, for example, can be used for this purpose. In particular, after the glass spheres have been placed in the area of the adhesive, it is possible to sprinkle powdered aluminum on them.

Another cover layer, which can consist of paper or plastic, is placed on the glass spheres. A thickness on the order of 0.15 mm is suitable for this cover layer. Before the film is applied in the area of the spoke shaft (3), the two cover films are separated. A suitable thickness for the support layer is about 0.25 mm.

As an alternative to wrapping the spoke shaft (3) with a strip-like film, it is also possible to produce a tubular structure from the film first and to slide this tube onto the spoke shaft (3). It can be attached, for example, by a shrinkage process or by activation of an adhesive.

In accordance with another embodiment, it is also possible to fix the glass spheres directly on the spoke shaft (3). This can be accomplished, for example, by galvanizing, ultrasound, fusion, or immersion in a liquid.

The invention claimed is:

1. Spoke for joining a wheel hub to a wheel rim, wherein a surface (19) of the spoke is covered with a film (7), wherein the film is formed as a strip (6) glued individually to a single spoke prior to insertion of the spoke in the wheel and is provided with a reflective and/or luminescent coating (12) on its side facing away from the surface (19), and wherein the strip (6) has a length which is greater than a width thereof, the film having a plurality of glass spheres in a region of an upper surface of the film, the film being unwound from a roll prior to being glued on the spoke.

2. Spoke in accordance with claim 1, wherein the side of the film (7) facing away from the coating (12) is covered with an adhesive (10), which strongly adheres to the surface (19).

3. Spoke in accordance with claim 2, wherein the side covered with the adhesive (10) is covered by a protective layer (11), which is to be removed before adhesive bonding.

4. Spoke in accordance with claim 3, wherein the protective layer (11) is formed as a coherent cover layer, which, when it is pulled off, leaves the adhesive (10) on the side of the film (7) covered with it.

5. Spoke in accordance with claim 1, wherein the film (7) has a consistency that allows it to tightly fit the surface (19) to be wrapped.

6. Spoke in accordance with claim 5, wherein the film (7), together with its coating (12), has a thickness of at most 0.25 mm.

7. Spoke in accordance with claim 5, wherein the film (7) furnished with the coating (12) has an elasticity of at least 5-50%.

8. Spoke in accordance with claim 5, wherein the unstretched film (7) formed as a strip (6) has a width which is greater than the circumference of the spoke (1).

9. Spoke in accordance with claim 8, wherein the strip (6) is wound around the spoke (1) in such a way that a beginning and an end of the strip (6) overlap.

10. Spoke in accordance with claim 9, wherein the coating (12) is provided with a protective layer (14).

11. Spoke in accordance with claim 10, wherein the protective layer (14) can be removed from the coating (12) of the film (7).

12. Spoke in accordance with claim 10, wherein the protective layer (14) has a consistency that prevents buckling of the coated film (7).

13. Spoke in accordance with claim 12, wherein the protective layer (14) has a thickness of at least 0.15 mm.

14. Spoke in accordance with claim 10, wherein, after the film (7) has been applied, the adhesive (10) adheres more strongly to the surface (19) of the spoke (1) than the protective layer (14) adheres to the coating (12).

15. Spoke in accordance with claim 10, wherein the protective layer (14) is formed as a coherent layer, which, when it is pulled off, leaves the coating (12) on the film (7).

16. Method for applying a self-adhesive film to the surface of a single spoke prior to the spoke being inserted in a wheel, wherein a strip (6) is separated from the film, which is wound on a roll; that an end of a protective layer (11) that covers the adhesive (10) is removed from the strip (6); that the uncovered adhesive (10) on the end of the strip (6) is adhesively applied to the surface (19) of the spoke (1), and the protective layer (11) is pulled off the adhesive (10); and that, while the protective layer (11) is being pulled off, the side of the film (7) that is covered with adhesive (10) is pressed onto the surface (19) of the spoke (1), the film having a plurality of glass spheres in a region of an upper surface of the film.

17. Method in accordance with claim 16, wherein an undersized length of strip (6) is removed from the roll and, during its application to the surface (19) of the spoke (1), it is stretched and adhesively attached to the surface (19) of the spoke (1) under tension.

18. Method in accordance with claim 16, wherein the side of the strip (6) that faces away from the adhesive (10) is inserted in an open mold (23), the spoke (1) is lowered onto the surface of the strip (6) that is covered with the adhesive (10), the protective layer (11) is removed from the adhesive (10), and then the mold (23) is closed, which causes the strip (6) to be pressed against the surface (19) of the spoke (1).

19. Method in accordance with claim 16, wherein the strip (6), starting at its end that is adhesively attached to the surface (19) of the spoke (1), is guided around the spoke (1) in the form of a spiral (30), during which process the protective layer (11) is pulled off, and the adhesive (10) is bonded with the surface (19) of the spoke (1).

20. Method in accordance with claim 19, wherein the spoke (1) is moved longitudinally past a transfer point (31) that guides the strip (6) towards the surface (19) of the spoke (I), and in the process the layer of adhesive (10) of the strip (6) is pressed onto the surface (19) of the spoke (1), and the spoke (1) is turned about its longitudinal axis as it moves in its longitudinal direction.

21. Method in accordance with claim 20, wherein the motions of the spoke (1) in the longitudinal direction, on the one hand, and about its longitudinal axis, on the other hand, are mutually adjusted in such a way that the spoke (1) is wrapped in the form of an advancing spiral (30).

22. Method in accordance with claim 16, wherein a protective layer (14) on the opposite side of the strip (6) from the adhesive (10) is removed from the strip (6), one end (32) of which is adhesively attached to the surface (19) of the spoke (1).

23. Method in accordance with claim 22, wherein the protective layer (14) is removed from the reflective and/or luminescent coating (12) of the film (7).

24. Method in accordance with claim 16, wherein the spokes (1) are washed in a fat-dissolving cleaning liquid before the film (7) is applied.

25. Method in accordance with claim 16, wherein, before it is applied to the spoke (1), the film (7) is formed as a tube and slid onto the spoke (1).

26. Method in accordance with claim 25, wherein the tube is shrunk onto the spoke (1).

27. Method in accordance with claim 25, wherein the tube is adhesively bonded with the spoke (1).

* * * * *